(12) United States Patent
Patel et al.

(10) Patent No.: US 11,621,601 B2
(45) Date of Patent: Apr. 4, 2023

(54) GENERATOR MAIN FIELD CONNECTION

(71) Applicant: Hamilton Sundstrand Corporation, Charlotte, NC (US)

(72) Inventors: Dhaval Patel, Loves Park, IL (US); Edward C. Allen, Davis, IL (US); Andrew R. Wilkinson, Cherry Valley, IL (US); Andrew P. Grosskopf, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/720,598

(22) Filed: Apr. 14, 2022

(65) Prior Publication Data
US 2022/0239179 A1   Jul. 28, 2022

Related U.S. Application Data

(62) Division of application No. 16/528,896, filed on Aug. 1, 2019, now Pat. No. 11,374,456.

(51) Int. Cl.
*H02K 3/50* (2006.01)
*H02K 3/02* (2006.01)
(Continued)

(52) U.S. Cl.
CPC ............... *H02K 3/50* (2013.01); *H02K 3/02* (2013.01); *H02K 11/0094* (2013.01); *H02P 9/107* (2013.01)

(58) Field of Classification Search
CPC ......... F02F 3/00; F02B 1/04; F05C 2201/021; F05C 2203/0808; F05C 2225/02; F05C 2251/042; H02K 11/0094; H02K 11/042; H02K 19/36; H02K 19/38; H02K 2213/03; H02K 3/02; H02K 3/50; H02P 9/107; Y02E 10/72
See application file for complete search history.

(56) References Cited

U.S. PATENT DOCUMENTS 3,611,007 A   10/1971  Miske, Jr.
5,587,616 A   12/1996  Johnsen
(Continued)

FOREIGN PATENT DOCUMENTS

EP   2773031 A2   9/2014
EP   E P-2773031 A2 *  9/2014  ................ F16B 2/20
EP   2940840 A2   11/2015

OTHER PUBLICATIONS

European Search Report for EP Application No. 19215020.9 dated Jun. 26, 2020.

*Primary Examiner* — Naishadh N Desai
(74) *Attorney, Agent, or Firm* — Carlson, Gaskey & Olds, P.C.

(57) ABSTRACT

A main field connection to connect to a main field winding has a semi-cylindrical portion with an axially thicker outer surface, an axially thinner inner surface, with an aperture. An extending portion extends from the semi-cylindrical portion to a remote extending end. The remote extending end extends for a first axial distance. The axially thicker portion of the semi-cylindrical portion extends for a second axial distance. A ratio of the first axial distance to the second axial distance is between 0.65 and 1.4. A rotating assembly, a generator and a method are also disclosed.

20 Claims, 8 Drawing Sheets

(51) Int. Cl.
*H02K 11/00* (2016.01)
*H02P 9/10* (2006.01)

(56) References Cited

U.S. PATENT DOCUMENTS

| | | |
|---|---|---|
| 7,944,100 B2 | 5/2011 | Lemmers, Jr. et al. |
| 3,018,114 A1 | 9/2011 | Rasmussen et al. |
| 9,035,508 B2 | 5/2015 | Grosskopf et al. |
| 9,312,742 B2 | 4/2016 | Grosskopf et al. |
| 10,460,861 B1 | 10/2019 | Patel et al. |
| 2013/0300231 A1 | 11/2013 | Grosskopf et al. |
| 2014/0239777 A1 | 8/2014 | Hasan et al. |
| 2014/0246957 A1* | 9/2014 | Grosskopf ........... H02K 11/028 310/67 R |

\* cited by examiner

GENERATOR MAIN FIELD CONNECTION

CROSS-REFERENCE TO RELATED APPLICATIONS

This application is a divisional of U.S. patent application Ser. No. 16/528,896 filed Aug. 1, 2019.

BACKGROUND

This application relates to a main field connection for use in a high speed generator.

Generators are known and typically have an input shaft connected to a source of rotation. The input shaft rotates when driven by the source of rotation causing a main field winding to rotate adjacent to a main stator. Electrical energy is generated in the main stator from the rotation of the main field winding.

A DC voltage must be supplied to the main field winding. In known generators, an exciter stator is positioned adjacent an exciter rotor and transmits AC three phase current to a rectifier pack. The rectifier pack rectifies the three phase AC current into a DC current. A positive bus and a negative bus extend from the rectifier pack into positive and negative rails associated with a connector or resistor pack. The resistor pack communicates the DC voltage through negative and positive main field connections to the main field windings.

In the past, the main field connections have utilized beryllium copper elements to connect to both positive and negative rails.

SUMMARY

A main field connection to connect to a main field winding has a semi-cylindrical portion with an axially thicker outer surface, an axially thinner inner surface, with an aperture. An extending portion extends from the semi-cylindrical portion to a remote extending end. The remote extending end extends for a first axial distance. The axially thicker portion of the semi-cylindrical portion extends for a second axial distance. A ratio of the first axial distance to the second axial distance is between 0.65 and 1.4.

A rotating assembly, a generator and a method are also disclosed.

These and other features may be best understood from the following drawings and specification.

DETAILED DESCRIPTION

Figure 1:
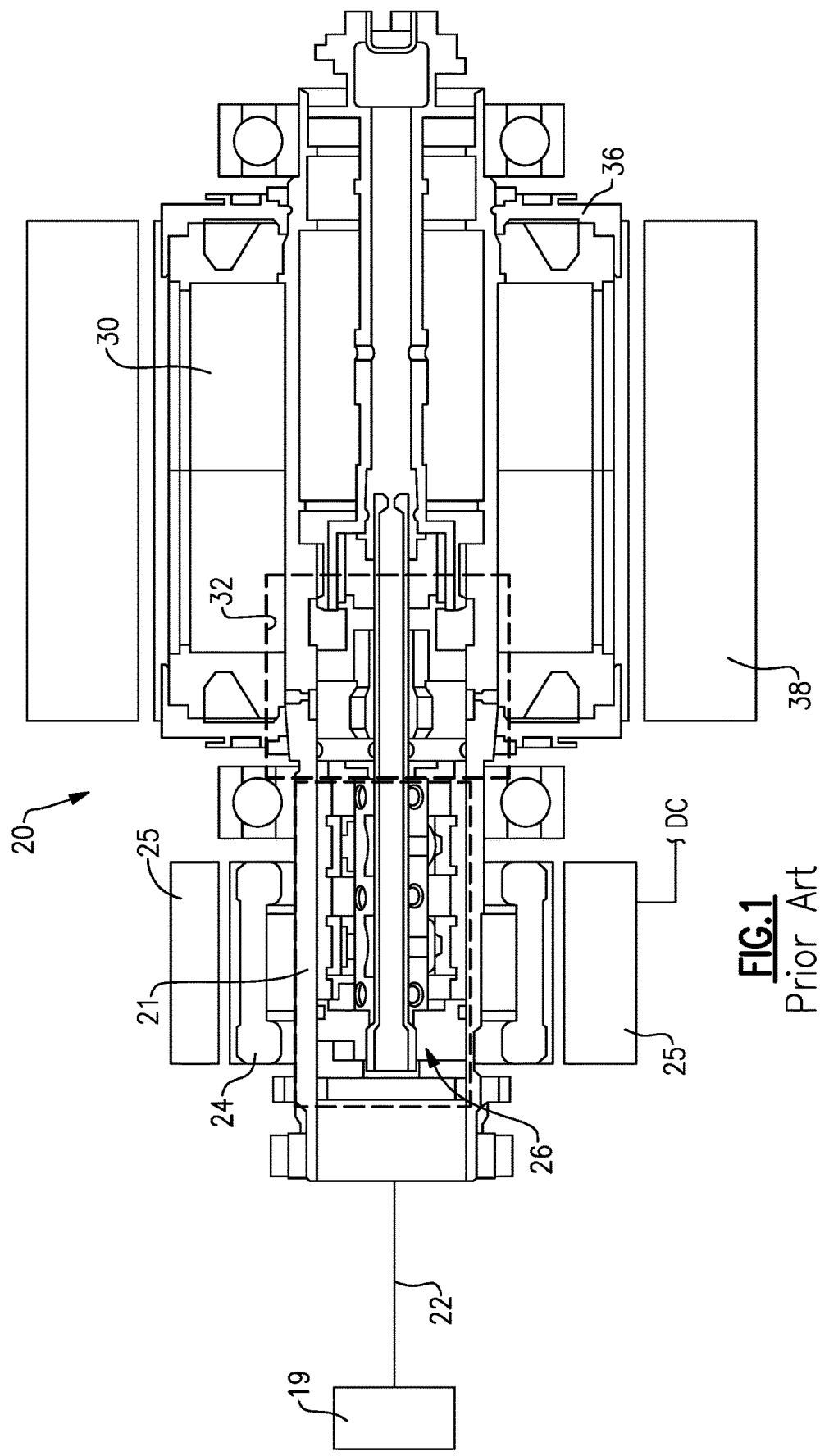
FIG. 1 schematically shows a high speed generator.

FIG. 1 shows a high speed generator 20 receiving an input 22. Input 22 could be a shaft driven by a turbine in an associated gas turbine engine 19 such as used on an aircraft. The input shaft 22 drives a shaft 21.

An exciter stator 25 surrounds an exciter rotor 24. A rectifier assembly 26 rotates with the exciter rotor 24 and the shaft 21.

Figure 2:
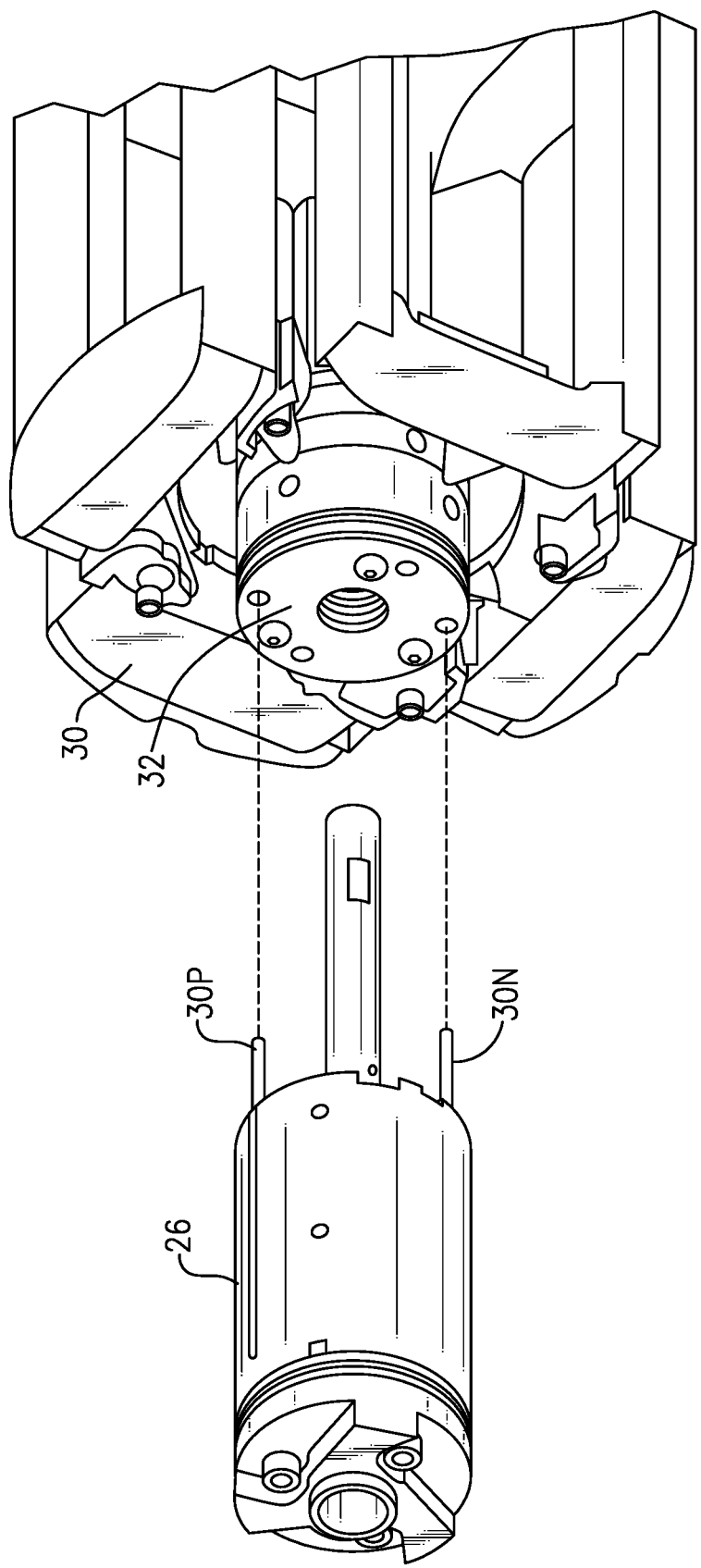
FIG. 2 shows a connection detail.

FIG. 2 shows the rectifier pack 26 having connections 30P and 30N extending toward a connection assembly 32.

Returning to FIG. 1, the connection assembly 32 includes a positive rail, which receives the connection 30P, and negative rail which receives connection 30N.

In practice, three phase AC current is supplied from the exciter stator 25 to the exciter rotor 24. That three phase AC current is rectified in DC by the rectifier pack 26 and supplied to the connection assembly. Then, from the connection assembly the positive and negative main field connections are connected to the main field windings 36. Main stator 38 is also shown. As mentioned above, during operation, the input 22 causes the rotating components to rotate and electric power is generated at the main stator 38.

Figure 3:
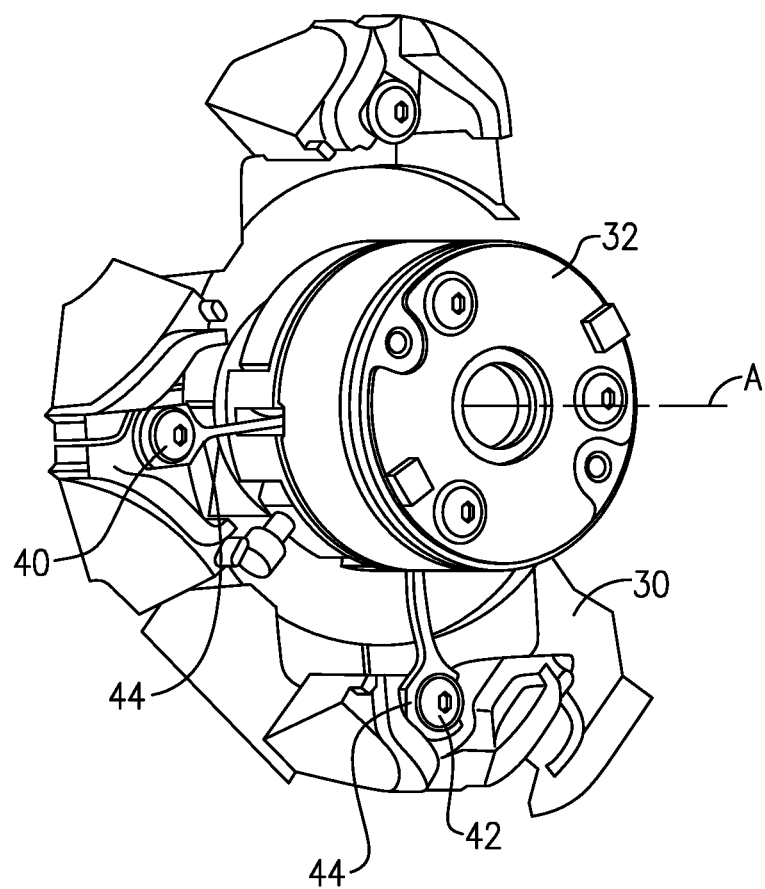
FIG. 3 shows the connection of a connection assembly to a main field rotor.

FIG. 3 shows the connection assembly 32 and its connection to the main field winding 30. Fasteners 40 and 42 secure main field connections 44. As understood, one of the main field connections 44 provides a positive connection and the other provides a negative connection.

Figure 4A:
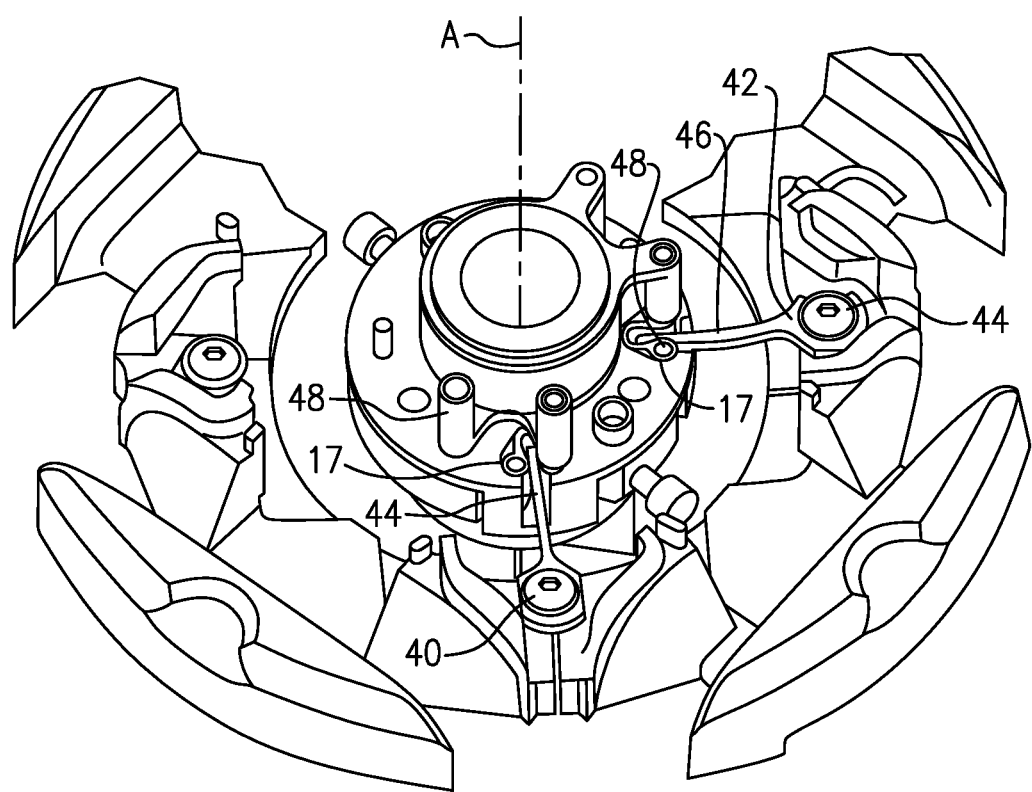
FIG. 4A shows connection details.

FIG. 4A shows further details of the main field connections 44 each having an arm 46 extending to be between a spring 48 received in respective pockets 17.

Figure 4B:
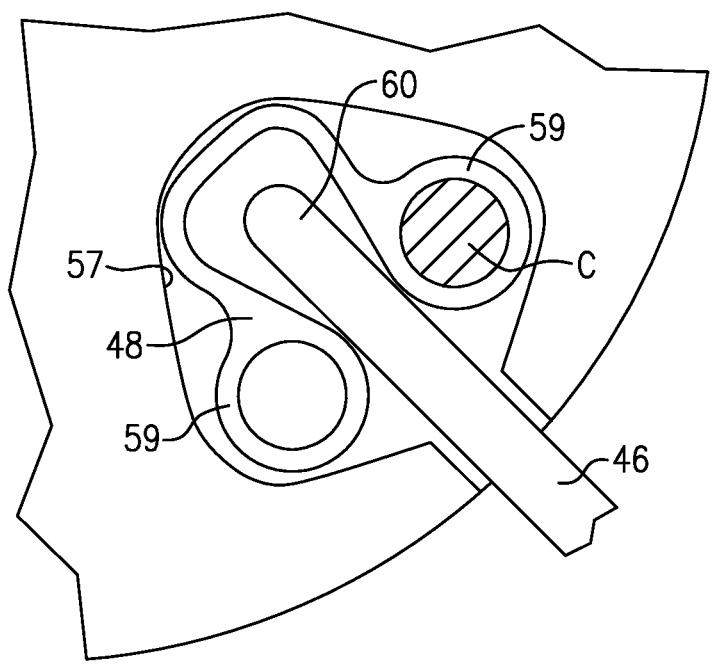
FIG. 4B shows a detail of FIG. 4A.

FIG. 4B shows the springs 48 having a pair of spring hoops 59, one of which receives a connection pin C. The spring 48 is received in pocket 17 and flexes outwardly such that the hoops 59 are biased against arm 46 at an inner end 60.

Figure 4C:
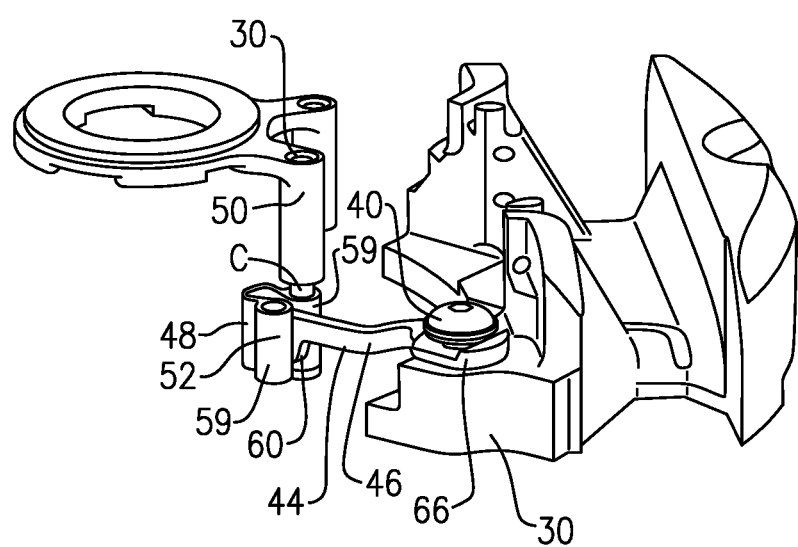
FIG. 4C shows yet another detail.

FIG. 4C shows a connection rail 50 having a pin C received in one of the hoops 59. As can be seen, the inner end 60 of the connection 44 extends for a greater axial distance than does an outer portion 66 which receives the fastener 40 to connect to the field winding 30.

Figure 5:
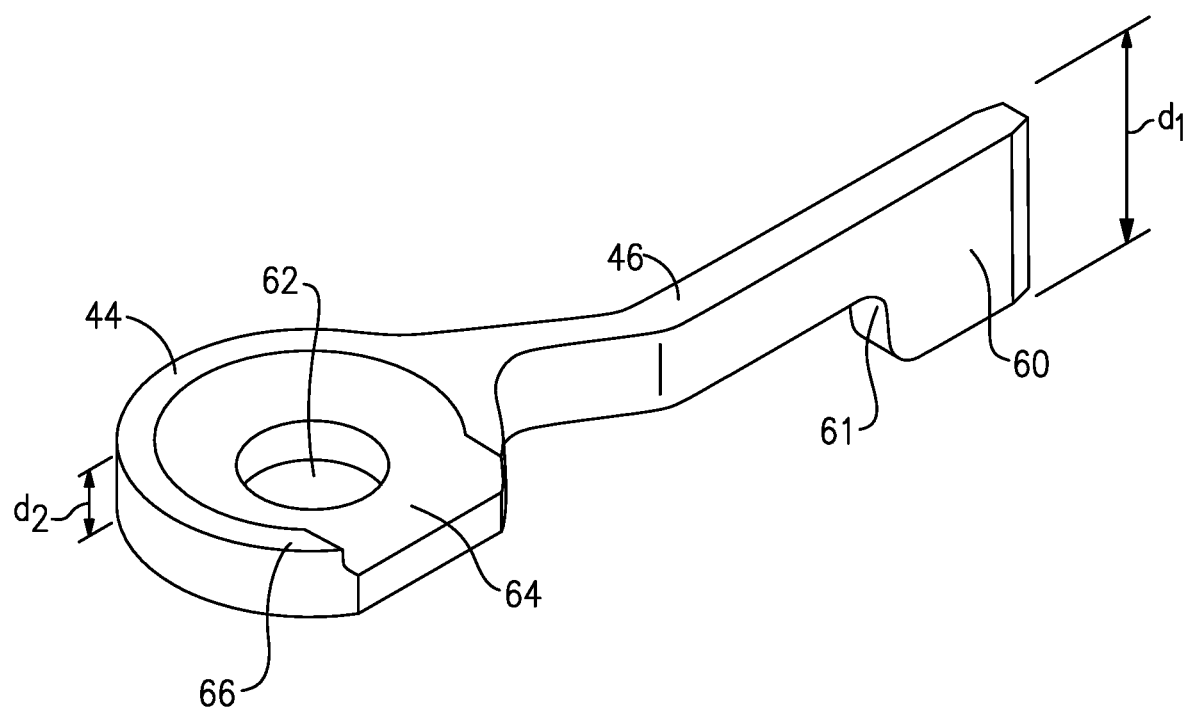
FIG. 5 shows a prior art connector.

FIG. 5 shows a detail of the prior art connection 44. As shown, an aperture 62 will receive the fastener. A part cylindrical portion which receives the pin and includes the aperture 62 includes an axially thicker outer portion 66 and an inner axially thinner portion 64 that will actually support the pin. The arm 46 extends to the inner connector end 60. As shown, the inner connector end 60 could be called a tang. A bend 61 connects the extending arm 46 into the tang 60. The tang 60 could be said to extend for an axial distance $d_1$. The thicker portion 66 could be said to extend for an axial distance $d_2$. In known connections a $d_1$ was 0.200 inch (0.508 cm) and $d_2$ was 0.075 inch (0.191 cm). The bend 61 provides a high stress zone. The high stress zone provided by the bend 61 results in the connection 44 being formed of beryllium copper. It would be desirable to utilize a material other than beryllium copper.

Figure 6A:
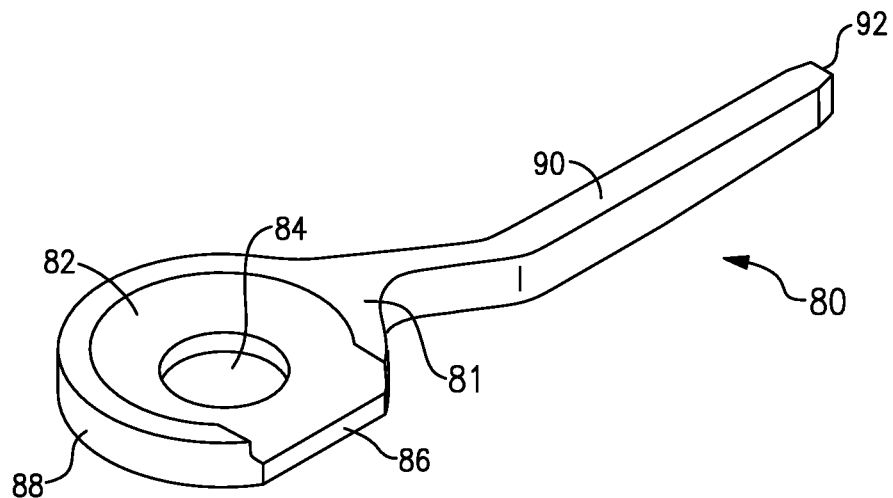
FIG. 6A shows a new connector in a perspective view.

FIG. 6A shows a disclosed main field connection 80. Main field connection 80 has a body 81 with the part cylindrical portion 82 with an axially thicker portion 88 and the axially thinner portion 86. An aperture 84 extends through the thinner portion 86. The connection 80 is intended to be connected into the same location as the connections 44 in the prior art. An extending portion 90 extends to a remote end 92.

Figure 6B:
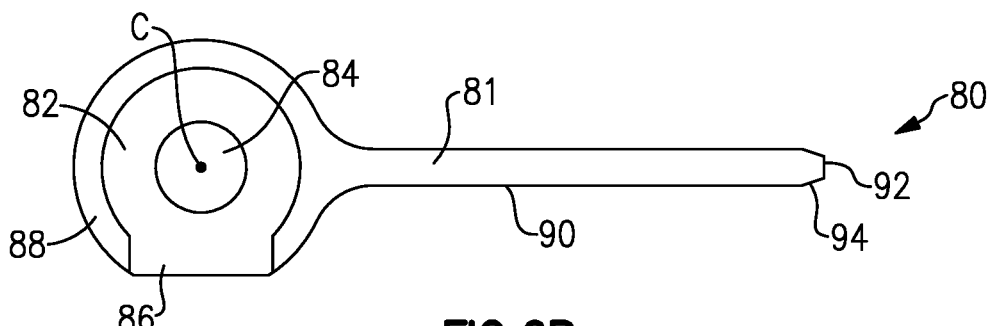
FIG. 6B is a top view of the new connector.

As can be appreciated in FIG. 6B, remote end 92 has chamfers 94 on each of two circumferential sides.

Figure 6C:
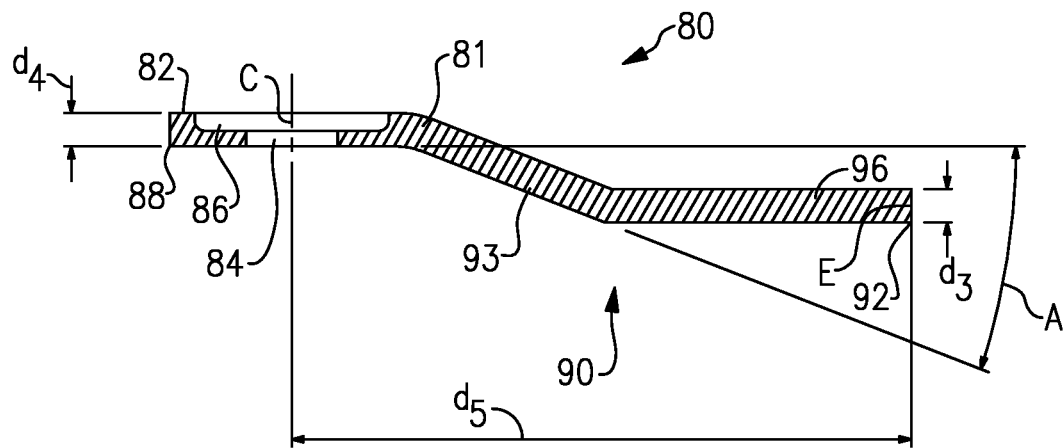
FIG. 6C is a cross-sectional view through the new connector.

FIG. 6C is a cross-section which bisects aperture 84 and remote end 92. As shown, inner or remote end 92 extends for an axial distance $d_3$. The extending portion 90 has a first section 93 extending axially away from the part cylindrical portion 82 at an angle A, and then to a remote extending portion 96 which extends in a direction parallel to a plane of the part cylindrical portion 82. The thicker portion 88 of the part cylindrical portion 82 extends for an axial distance $d_4$. The axial dimension is defined through a center point C of aperture 84.

$d_3$ and $d_4$ may be 0.070 inch (0.178 cm) (+/−0.010 inch) (0.025 centimeters). The thinner portion may extend for an axial distance that is half of $d_4$.

In embodiments, it could be said that a ratio of $d_3$ to $d_4$ is between 0.65 and 1.4. Although defined here as a third and fourth distance, as claimed, they will be a first and second axial distance.

The angle A may be 22°. In embodiments, the angle A may be between 15 and 30°. A distance from center point C and a point E on the end 92 is identified as $d_5$. In embodiments, $d_5$ is 0.960 inch (2.438 centimeters) (+/−0.010 inch) (0.025 centimeters). A ratio of $d_5$ to $d_1$ may be between 10 and 18.

Connection 80 may be stamped of a copper which is of a lower strength and less challenging than beryllium copper. The connection 80 is stamped from a thin strip of copper. The axially thinner portion 86 may be coined into the stamped semi-cylindrical portion 82.

A method of replacing a connection in a generator comprising removing a removed connection between a connection assembly 32 and a main field winding 30 and replacing the removed connection with a replacement connection 80. The replacement connection is connected to a main field winding. The replacement connection 80 has a semi-cylindrical portion 82 with an axially thicker outer surface 88, an axially thinner inner surface 86 with an aperture 84. An extending portion 90 extending from the semi-cylindrical portion 82 to a range end 92. The extending end extending for a first axial distance $d_1$ and the axially thicker portion of the semi-cylindrical portion extending for a second axial distance $d_2$. A ratio of the first axial distance to the second axial distance is between 0.65 and 1.4.

In embodiments, the removed connection is removed as part of the entire rotating assembly. In another embodiment, the removed connection is removed on its own and replaced with the replacement connection.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of replacing a connection in a generator comprising:
   removing a removed connection between a connection assembly and a main field winding and replacing said removed connection with a replacement connection, said replacement connection connected to the main field winding;
   the replacement connection having a semi-cylindrical portion with an axially thicker outer surface, an axially thinner inner surface and with an aperture, and an extending portion extending from said semi-cylindrical portion to a remote end; and
   an axial dimension defined through a center point of said aperture, said remote end extending for a first axial distance and said axially thicker portion of said semi-cylindrical portion extending for a second axial distance with a ratio of said first axial distance to said second axial distance being between 0.65 and 1.4.

2. The method of replacing a connection as set forth in claim 1, wherein said first and second axial distances are equal within a margin of error of +/−0.010 inch.

3. The method of replacing a connection as set forth in claim 2, wherein a third distance is defined from said center point of said aperture to said remote end, and a ratio of said third distance to said first axial distance is between 10 and 18.

4. The method of replacing a connection as set forth in claim 3, wherein said first axial distance and said second axial distance are each 0.070 inch (+/−0.010 inch).

5. The method of replacing a connection as set forth in claim 4, wherein said replacement connection is replaced between the same connection assembly and main field windings that had previously been connected by said removed connector.

6. The method of replacing a connection as set forth in claim 4, wherein said replacement connection is replaced into said generator with an entire replaced assembly including a main field winding and connection assembly.

7. The method of replacing a connection as set forth in claim 1, wherein said replacement connection is replaced between the same connection assembly and main field windings that had previously been connected by said removed connector.

8. The method of replacing a connection as set forth in claim 7, wherein said first and second axial distances are equal within a margin of error of +/−0.010 inch.

9. The method of replacing a connection as set forth in claim 7, wherein a third distance is defined from said center point of said aperture to said remote end, and a ratio of said third distance to said first axial distance is between 10 and 18.

10. The method of replacing a connection as set forth in claim 1, wherein said replacement connection is replaced into said generator with an entire replaced assembly including a main field winding and connection assembly.

11. The method of replacing a connection as set forth in claim 10, wherein said first and second axial distances are equal within a margin of error of +/−0.010 inch.

12. The method of replacing a connection as set forth in claim 10, wherein a third distance is defined from said center point of said aperture to said remote end, and a ratio of said third distance to said first axial distance is between 10 and 18.

13. The method of replacing a connection as set forth in claim 1, wherein a third distance is defined from said center point of said aperture to said remote end, and a ratio of said third distance to said first axial distance is between 10 and 18.

14. The method of replacing a connection as set forth in claim 13, wherein said first axial distance and said second axial distance are each 0.070 inch (+/−0.010 inch).

15. The method of replacing a connection as set forth in claim 1, wherein said first axial distance and said second axial distance are each 0.070 inch (+/−0.010 inch).

16. The method of replacing a connection as set forth in claim 1, wherein there is a positive connection and a negative connection between the connection assembly and the main field winding, and one of the negative and positive connections being said removed connection.

17. The method of replacing a connection as set forth in claim 16, wherein said connection assembly includes a positive rail and a negative rail.

18. The method of replacing a connection as set forth in claim 17, wherein a fastener secures said replacement connection.

19. The method of replacing a connection as set forth in claim 1, wherein a fastener secures said replacement connection.

20. The method of replacing a connection as set forth in claim 1, wherein said replacement connection is stamped out of a copper material.

\* \* \* \* \*